(12) United States Patent
Fujita et al.

(10) Patent No.: US 6,645,394 B2
(45) Date of Patent: Nov. 11, 2003

(54) HIGH FREQUENCY MAGNETIC MATERIAL CERAMIC COMPOSITION AND IRREVERSIBLE CIRCUIT COMPONENT

(75) Inventors: Yuko Fujita, Shiga-ken (JP); Tatsuya Matsunaga, Shiga-ken (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 10/146,891

(22) Filed: May 17, 2002

(65) Prior Publication Data

US 2003/0006394 A1 Jan. 9, 2003

(30) Foreign Application Priority Data

May 17, 2001 (JP) ........................................ 2001-148007

(51) Int. Cl.[7] .............................. H01P 1/32; C04B 35/40
(52) U.S. Cl. ................ 252/62.6; 252/62.63; 252/62.59; 252/62.57; 333/1.1; 333/24.2; 335/302
(58) Field of Search ............................ 335/302; 333/1.1, 333/24.2; 252/62.63, 62.6, 62.57, 62.59

(56) References Cited

FOREIGN PATENT DOCUMENTS

| JP | 06-061708 | 3/1994 |
|---|---|---|
| JP | 06-164222 | 10/1994 |
| JP | 07-212108 | 8/1995 |

OTHER PUBLICATIONS

Effective Linewidth due to Porosity and Anisotropy in Polycrystalline Yittrium Iron Garnet and Ca–V–Substituted Yittrium Iron Garnet at 10 GHz; Carl E. Patton; Physical Review, Mar. 10, 1969; vol. 179, No. 2.

Ferrites, Proceedings of the ICF 8; The Japan Society of Powder and Powder Metallurgy.

*Primary Examiner*—C. Melissa Koslow
(74) *Attorney, Agent, or Firm*—Dickstein, Shapiro, Morin & Oshinsky, LLP.

(57) ABSTRACT

A high frequency magnetic material ceramic composition including materials having the general formula $(Ca, A)_z Cu_x B_{8-x-z} O_{12}$ is prepared. A represents Y and/or at least one element selected from the rare earth elements excluding Y; B represents metal elements which are different from A and include at least Fe and V. x has a value of $0.002 < x < 0.2$; and z is a value of $3.0 < z \leq 3.09$. The Ca/V ratio is $2.0 < Ca/V \leq 2.4$. A irreversible circuit component containing center electrodes electrically insulated from each other in a ferrite member made of the high frequency magnetic material ceramic is provided.

20 Claims, 1 Drawing Sheet

HIGH FREQUENCY MAGNETIC MATERIAL CERAMIC COMPOSITION AND IRREVERSIBLE CIRCUIT COMPONENT

BACKGROUND OF THE INVENTION

1. Field of the Invention

The present invention relates to a high frequency magnetic material ceramic composition for constituting a high frequency irreversible circuit component such as a circulator, an isolator or the like, and to an irreversible circuit component using the same.

2. Description of the Related Art

The size of radio communication devices in the communication apparatus field recently have been decreased, and the service frequency band-widths have been increased. Accordingly, it has been also required to reduce the size and increase the service band-widths for circuit parts intended for use in these fields.

Regarding the reduction in size of electronic parts, monolithic ceramic electronic parts employing laminated structures are known. The monolithic ceramic electronic part is ordinarily produced by preparing a plurality of formed ceramic green sheets and internal conductors, laminating the ceramic green sheets and the internal conductors, and firing the obtained laminate. In this method, the ceramic green sheets are fired simultaneously with the internal conductors. Therefore, it is necessary that a ceramic material for use in the ceramic green sheets can be sintered at a temperature lower than the melting point of the internal electrodes.

Yttrium (Y)—iron (Fe)—garnet materials used as one of the high frequency magnetic materials in circulators and isolators, which are typical high frequency circuit components, are widely known in the literature. See, e.g., Carl E. Patton "Effective Linewidth due to Porosity and Anisotropy in Polycrystalline Yttrium Iron Garnet and Ca-V-Substituted Yttrium Iron Garnet at 10 GHz", Phys. Rev., vol. 179, No. 2 (1969). These materials are expressed by the chemical formula $(Ca, Y)_3(Fe, V)_5O_{12}$.

The firing temperatures of the Y—Fe-garnet high frequency magnetic materials are high, that is, 1300° C. or higher. Thus, Japanese Unexamined Patent Application Publication No. 6-61708 proposes that in order to allow sintering integrally with the internal conductors, Pd and Pt having a high melting point be used as the internal conductors.

Pd and Pt, which have high melting points of 1300° C. or higher, can be sintered integrally with almost of all the high frequency magnetic materials. However, their resistivities are high. Thus, Pd and Pt have faults in that when they are used in laminated isolator components, the insertion loss is large.

It has been proposed that for the purpose of integrally firing the high frequency magnetic material and internal conductors, Ag and a material containing Ag as a major component be used to form the internal conductors, as described in Japanese Unexamined Patent Application Publication No. 7-212106.

When Ag, which has a low melting point of 961° C., is used as an internal conductor, high frequency magnetic materials capable of being sintered at a temperature lower than the melting point of the internal Ag conductor are preferably employed. As high frequency magnetic materials capable of being sintered at a temperature of up to 1000° C., a material having Bi added thereto and a garnet material having glass added thereto are exemplified. However, it has been difficult to produce these materials having a low loss, since heterogeneous phases are formed, and so forth.

Ca-V garnet materials for use as high frequency magnetic materials need to be sintered at a temperature of 1300° C. or higher in order to obtain a dense structure sintered member. If the sintering temperature is lower than 1300° C., a sufficient sintering density cannot be realized and the sintered member has problems in that the ferromagnetic resonance half-width ($\Delta H$) is small and the porosity is high.

It is known that the substitution by Bi and the addition of glass are effective for sintering at a low temperature. However, these components, Bi and glass, have faults in that they tend to generate heterogeneous phases so that the ferromagnetic resonance half-widths are increased.

SUMMARY OF THE INVENTION

It is an object of the present invention to provide a high frequency magnetic material ceramic composition useful as a high frequency magnetic material, which can be densely sintered at a low temperature with no heterogeneous phases being generated, and which has a small ferromagnetic resonance half-width, and to provide an irreversible circuit component using the same.

Accordingly, the present invention provides a high frequency magnetic material ceramic composition which comprises materials having the general formula $(Ca, A)_z Cu_x B_{8-x-z} O_{12}$ in which A represents Y and/or at least one element selected from the rare earth elements excluding Y, B represents metal elements which are different from A and include at least Fe and V, x is a value of $0.002 < x < 0.2$, z is a value of $3.0 < z \leq 3.09$, and the Ca/V ratio is a value of $2.0 < Ca/V \leq 2.4$. The elements are, other than as just indicated, conventional in yttrium-iron-garnets.

The reason for the above-described limitations with respect to the formula is as follows. If the Ca/V ratio is stoichiometric (2.0) or lower, the sintering temperature is inconveniently 1360° C., and if the Ca/V ratio is larger than 2.4, a heterogeneous phase is generated so that the ferromagnetic resonance half-width is increased.

When the amount of Cu, x, is $\leq 0.002$, the low temperature sintering effect can not be obtained because the sintering temperature becomes 1100° C. or higher. If $x \geq 0.2$, a heterogeneous phase is generated, and undesirably, the ferromagnetic resonance half-width is increased.

To obtain a high frequency magnetic material which can be sintered at a temperature of less than 1100° C. and has a small ferromagnetic resonance half-width, the range of $2.0 < Ca/V \leq 2.4$ and $0.002 < x < 0.2$ in the above-described general formula is preferred. Preferably, the range of x is $0.005 \leq x \leq 0.1$. Regarding the Cu amount, the low temperature sintering effect is remarkable at $0.02 \leq x \leq 0.1$.

Examples carried out at z=3.01 are described in this specification. Desirably, z is in the range of 3 (stoichiometric value) to 3.09. In this range, the low temperature sintering effect caused by Cu can be achieved.

In the high frequency magnetic material ceramic composition, B preferably further includes at least one element selected from Al, In and Zr. In the above-described constitution, the ferromagnetic resonance half-width can be set to be still smaller, since at least one of Al, In and Zn is further included in B.

The present invention moreover provides an irreversible circuit component which comprises a ferrite member made of the above-described high frequency magnetic material ceramic composition, plural center electrodes arranged in the ferrite member in such a manner as to be electrically insulated from each other and intersect, and a magnet section for applying a DC magnetic field to the respective center conductors and the ferrite member.

The firing temperature of the high frequency magnetic material ceramic composition is low, and the ferromagnetic resonance half-width is small. Thus, the heating cost can be reduced, and scattering and evaporation of a metallic part can be reduced, so that the circuit component has a high accuracy. Moreover, the loss, especially the loss at a high frequency, can be reduced due to the small ferromagnetic resonance half-width. With the irreversible circuit component of the present invention, superior characteristics such as reduction of cost, high accuracy and low loss can be achieved.

DESCRIPTION OF THE PREFERRED EMBODIMENTS

Figure 1:
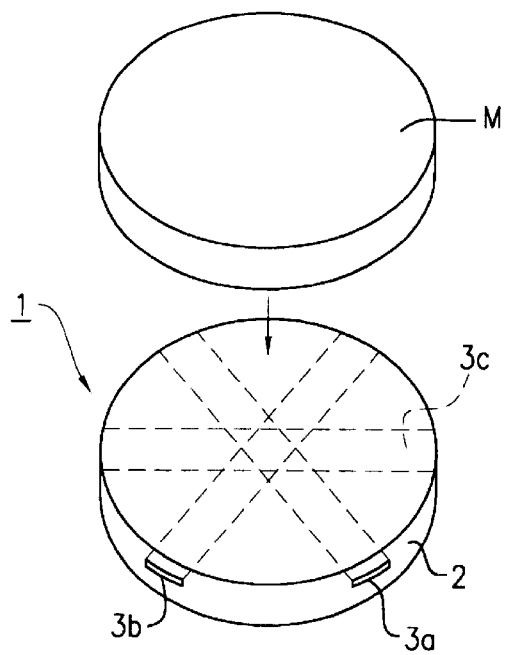
FIG. 1 is an exploded perspective view of an irreversible circuit component (high frequency circuit part) using the high frequency magnetic material ceramic composition of the present invention.
Figure 2:
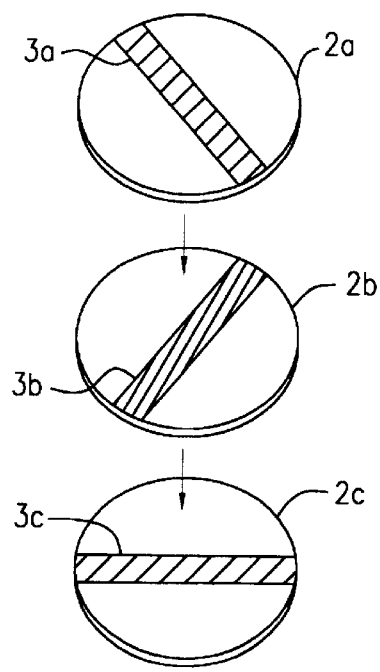
FIG. 2 is an exploded perspective view of a ferrite member of the irreversible circuit component, illustrating a process for manufacturing the irreversible circuit component using the high frequency magnetic material ceramic composition of the present invention.

Hereinafter, the high frequency magnetic material ceramic composition and the irreversible circuit component using the same according to the present invention will be described with reference to FIGS. 1 and 2.

The high frequency magnetic material ceramic composition of the present invention is represented by the general formula $(Ca, A)_z Cu_x B_{8-x-z} O_{12}$, in which A represents Y and/or at least one rare earth element excluding Y, B is different from A and represents metal elements including at least Fe and V, $0.002 < x < 0.2$, $3.0 < z \leq 3.09$, and the Ca/V ratio is $2.0 < Ca/V \leq 2.4$.

A method of producing the high frequency magnetic material ceramic composition will be described. First, as starting materials, powders of $CaCO_3$, $Y_2O_3$, $Fe_2O_3$, $In_2O_3$, $V_2O_5$, CuO and $ZrO_2$, each having a purity of 99% or higher, were prepared. These powders were mixed and processed according to a standard preparation method in such a manner as to produce a composition of $Ca_a Y_{z-a} Fe_{8-x-z-b-c-h-d} Cu_x V_b Al_c In_h Zr_d O_{12}$ ($z=3.01$). This composition is obtained by substituting Al and In, or Al, In and Zr for a part of the Fe sites in the composition represented by the chemical formula $Ca_a Y_{z-a} Fe_{8-x-z-b} Cu_x V_b O_{12}$.

Subsequently, the ferromagnetic resonance half-width of the produced high frequency magnetic material ceramic composition (ferrite), which is an index for representing the loss generated when the ferrite is used as an isolator component, was measured by means of a network analyzer. Tables 1 and 2 show the measurement results. In Tables 1 and 2, the samples where the sample numbers are marked by * are outside of the present invention. The firing temperature indicated in Tables 1 and 2 is the lowest one in the firing temperature range where the composition can achieve a ferromagnetic resonance half-width of 500 Oe or lower, and is effective for use as an isolator component.

In Table 1, Samples Nos. 1 to 9 are high frequency magnetic material ceramic compositions of the present rep-resented by the general formula $(Ca, A)_z Cu_x B_{8-x-z} O_{12}$ in which B is Fe and V. Samples Nos. 10 to 18 are those represented by the general formula $(Ca, A)_z Cu_x B_{8-x-z} O_{12}$ in which B is Fe, V, Al and In. Samples Nos. 19 to 27 are those presented by the general formula $(Ca, A)_z Cu_x B_{8-x-z} O_{12}$ in which B is Fe, V, Al, In and Zr.

TABLE 1

| Sample No. | Composition 1 | | | | | | | Firing temperature (° C.) | Half-width (Oe) |
|---|---|---|---|---|---|---|---|---|---|
| | x | a/b | a | b | c | h | d | | |
| 1* | 0.000 | 2.15 | 0.890 | 0.414 | 0.00 | 0.00 | 0.00 | 1100 | 30 |
| 2* | 0.002 | 2.15 | | | 0.00 | 0.00 | 0.00 | 1100 | 30 |
| 3 | 0.005 | 2.15 | | | 0.00 | 0.00 | 0.00 | 1060 | 45 |
| 4 | 0.010 | 2.15 | | | 0.00 | 0.00 | 0.00 | 1060 | 27 |
| 5 | 0.020 | 2.15 | | | 0.00 | 0.00 | 0.00 | 1040 | 42 |
| 6 | 0.050 | 2.15 | | | 0.00 | 0.00 | 0.00 | 1020 | 43 |
| 7 | 0.100 | 2.15 | | | 0.00 | 0.00 | 0.00 | 1040 | 43 |
| 8* | 0.200 | 2.15 | | | 0.00 | 0.00 | 0.00 | — | (148) |
| 9* | 0.500 | 2.15 | | | 0.00 | 0.00 | 0.00 | — | (272) |
| 10* | 0.000 | 2.15 | 0.890 | 0.414 | 0.30 | 0.20 | 0.000 | 1100 | 21 |
| 11* | 0.002 | 2.15 | | | 0.30 | 0.20 | 0.000 | 1100 | 30 |
| 12 | 0.005 | 2.15 | | | 0.30 | 0.20 | 0.000 | 1060 | 35 |
| 13 | 0.010 | 2.15 | | | 0.30 | 0.20 | 0.000 | 1060 | 24 |
| 14 | 0.020 | 2.15 | | | 0.30 | 0.20 | 0.000 | 1040 | 23 |
| 15 | 0.050 | 2.15 | | | 0.30 | 0.20 | 0.000 | 1020 | 20 |
| 16 | 0.100 | 2.15 | | | 0.30 | 0.20 | 0.000 | 1040 | 30 |
| 17* | 0.200 | 2.15 | | | 0.30 | 0.20 | 0.000 | — | (139) |
| 18* | 0.500 | 2.15 | | | 0.30 | 0.20 | 0.000 | — | (258) |
| 19* | 0.000 | 2.15 | 0.890 | 0.414 | 0.30 | 0.20 | 0.000 | 1100 | 21 |
| 20* | 0.002 | 2.15 | | | 0.30 | 0.20 | 0.002 | 1100 | 27 |
| 21 | 0.005 | 2.15 | | | 0.30 | 0.20 | 0.005 | 1060 | 30 |
| 22 | 0.010 | 2.15 | | | 0.30 | 0.20 | 0.010 | 1060 | 22 |
| 23 | 0.020 | 2.15 | | | 0.30 | 0.20 | 0.020 | 1040 | 20 |
| 24 | 0.050 | 2.15 | | | 0.30 | 0.20 | 0.050 | 1020 | 20 |
| 25 | 0.100 | 2.15 | | | 0.30 | 0.20 | 0.100 | 1040 | 30 |
| 26* | 0.200 | 2.15 | | | 0.30 | 0.20 | 0.200 | — | (162) |
| 27* | 0.500 | 2.15 | | | 0.30 | 0.20 | 0.500 | — | (285) |

Composition 1 in Table 1 represents $Ca_a Y_{z-a} Fe_{8-x-z-b-c-h-d} Cu_x V_b Al_c In_c Zr_d O_{12}$, and the half-width column is a ferromagnetic resonance half-width in oersteds (Oe). One oersted (Oe) is $(1/4\pi) \times 10^3$ ampere per meter (A/m).

For each sample marked by a bar (−) in Table 1, the ferromagnetic resonance half-width did not become less than 50 Oe even though the firing temperature was increased. In these cases, the value enclosed in parenthesis is the ferromagnetic resonance half-width obtained when the composition was fired at 1100° C.

The Cu substitution amount was varied while the Ca/V ratio (a/b) was set to be constant, that is, was maintained at 2.25, and effects of the Cu amounts (x) on the firing temperature and the ferromagnetic resonance half-width were investigated. Table 1 shows the results.

As seen in Samples Nos. 3 to 7 and 12 to 16, when the Cu substitution amount (x) was set to be in the range of $0.002 < x < 0.2$, preferably $0.005 \leq x \leq 0.1$, and more preferably, $0.02 \leq x \leq 0.1$, the low temperature sintering effect could be obtained, and moreover, high frequency magnetic material ceramic compositions (high frequency magnetic materials) having small ferromagnetic resonance half-widths could be produced.

When the Cu substitution amount was excessively small ($x \leq 0.002$), the low temperature sintering effect caused by the Cu substitution could hardly been observed. That is, the firing temperature was 1100° C. Also, when the Cu substitution amount was too much ($x \geq 0.2$), an heterogeneous phase was undesirably formed, and the ferromagnetic resonance half-width was increased.

As seen in Sample Nos. 10 to 18, the materials having small ferromagnetic resonance half-widths (ΔH) could be obtained, since Al and In were incorporated in addition to Fe and V. Moreover, if a metal element capable of being substituted for Fe (especially, $Fe^{3+}$) in the garnet lattice of the high frequency magnetic material ceramic composition is used as B, similar advantages can be obtained.

Tetravalent ions such as Zr ion or the like are selected as a charge-compensating component for $Cu^{2+f}$. Even when other tetravalent ions are selected to be incorporated in B, similar advantages can be obtained. Moreover, rare earth metals may be selected from the lanthanoids (atomic numbers 57 to 71) and the actinoids (atomic numbers 89 to 103) in addition to Y. In this case, similar advantages can be also obtained.

The effects of the Cu substitution amount caused when the Ca/V ratio (a/b) was changed were investigated. Table 2 shows the results. Composition II in Table 2 represents $Ca_aY_{z-a}Fe_{8-x-z-b-c-h}Cu_xV_bAl_cIn_hO_{12}$.

TABLE 2

| Sample No. | a/b | a | b | x | c | h | Firing temperature (° C.) | Half-width (Oe) |
|---|---|---|---|---|---|---|---|---|
| 28* | 2.00 | 0.890 | 0.445 | 0.00 | 0.3 | 0.2 | 1360 | 28 |
| 29* | 2.05 | | 0.434 | 0.00 | 0.3 | 0.2 | 1100 | 43 |
| 30* | 2.10 | | 0.424 | 0.00 | 0.3 | 0.2 | 1100 | 35 |
| 31* | 2.15 | | 0.414 | 0.00 | 0.3 | 0.2 | 1100 | 21 |
| 32* | 2.20 | | 0.405 | 0.00 | 0.3 | 0.2 | 1100 | 28 |
| 33* | 2.25 | | 0.396 | 0.00 | 0.3 | 0.2 | 1100 | 31 |
| 34* | 2.35 | | 0.379 | 0.00 | 0.3 | 0.2 | 1100 | 34 |
| 35* | 2.40 | | 0.371 | 0.00 | 0.3 | 0.2 | 1100 | 38 |
| 36* | 2.45 | | 0.363 | 0.00 | 0.3 | 0.2 | — | (62) |
| 37* | 2.00 | 0.890 | 0.445 | 0.05 | 0.3 | 0.2 | 1330 | 22 |
| 38 | 2.05 | | 0.434 | 0.05 | 0.3 | 0.2 | 1060 | 21 |
| 39 | 2.10 | | 0.424 | 0.05 | 0.3 | 0.2 | 1020 | 22 |
| 40 | 2.15 | | 0.414 | 0.05 | 0.3 | 0.2 | 1020 | 20 |
| 41 | 2.20 | | 0.405 | 0.05 | 0.3 | 0.2 | 1020 | 22 |
| 42 | 2.25 | | 0.396 | 0.05 | 0.3 | 0.2 | 1020 | 26 |
| 43 | 2.35 | | 0.379 | 0.05 | 0.3 | 0.2 | 1020 | 29 |
| 44 | 2.40 | | 0.371 | 0.05 | 0.3 | 0.2 | 1040 | 32 |
| 45* | 2.45 | | 0.363 | 0.05 | 0.3 | 0.2 | — | (70) |

When the Ca/V ratio was more than 2.0, preferably between 2.05 and 2.4 and more preferably between 2.05 and 2.2, high frequency magnetic material ceramic compositions having small ferromagnetic resonance half-widths could be obtained.

When Ca/V≦2.0, the sintering temperature was high, e.g., 1360° C. as seen in Sample No. 28. Although the Cu substitution was carried out, the sintering temperature was 1330° C. as seen in Sample No. 37. In the range of Ca/V>2.4, the ferromagnetic resonance half-width obtained at a sintering temperature of 1100° C. was undesirably increased. Thus, by setting the Ca/V ratio to be in the range of 2.0<Ca/V≦2.4 and carrying out the Cu substitution, the low temperature sintering effect of the Cu substitution can be realized.

An irreversible circuit component for operation in a microwave band using a ferrite made of the high frequency magnetic material ceramic composition of the present invention will be described with reference to FIGS. 1 and 2. As shown in FIG. 1, an irreversible circuit component 1 has a structure in which belt-shaped center electrodes 3a to 3c are embedded in a disk-shaped ferrite member 2.

The plural center electrodes 3a to 3c are arranged in such a manner that the thickness directions of the center electrodes 3a to 3c substantially coincide with that of the ferrite member 2, and the center electrodes 3a to 3c pass through the center of the member 2 and are extended and exposed onto the side surface of the ferrite member 2. Moreover, the plural center electrodes 3a to 3c are arranged in such a manner that they intersect nearly in the center of the ferrite member 2, forming an angle of about 120° to each other, at an interval in the thickness direction between them so that they are electrically insulated from each other via the ferrite member 2.

Moreover, a permanent magnet M is disposed as a magnet member in the irreversible circuit component 1 in such a manner that DC magnetic field is applied to the ferrite member 2 in the thickness direction thereof. The magnet member is not limited to the magnet, and a coil for generating DC magnetic field or the like may be employed.

The above-described irreversible circuit component 1 can be used, e.g., as a circulator, an isolator, and so forth, since the ferrite contained in the component 1 has a low sintering temperature and provides a small ferromagnetic resonance half-width. The circuit component 1 has superior characteristics such as low cost, high precision and low loss.

Hereinafter, an example of the method of producing the irreversible circuit component 1 will be described with reference to FIG. 2. First, powders for a magnetic material having a composition as to provide the high frequency magnetic material ceramic composition of the present invention are mixed with an organic binder and an organic solvent to produce slurry for forming the magnetic material. Subsequently, the produced slurry for the magnetic material is formed into green sheets 2a to 2c each having a thickness of ten μm to several ten μm, by a doctor blade method.

Thereafter, a paste for forming an electrode, produced by mixing a conductive powder of gold with an organic solvent, is printed in a belt-shape on the upper surfaces of the green sheets 2a to 2c for the magnetic material (the surfaces on the same sides in the thickness direction of the green sheets 2a to 2c) by a screen printing method to form the center electrodes 3a to 3c.

Subsequently, the green sheets 2a to 2c for the magnetic material are arranged and laminated in such a manner that the center electrodes 3a to 3c form an angle of about 120° to each other at intervals in the thickness direction. An appropriate number of green sheets for the magnetic member having no center electrode formed thereon are press-laminated onto each of the upper and under surfaces of the laminate (the opposite surfaces in the thickness direction of the ferrite member 2) (not shown).

Then, the obtained formed product is fired at a temperature of 1020° C. to 1060° C. in a baking furnace, whereby the irreversible circuit component 1 having the center electrodes 3a to 3c arranged and embedded in the ferrite member 2 is obtained.

The firing temperature for the irreversible circuit component 1 can be set to be low. Thus, reduction of the shape-accuracy of the component 1, which may be caused by scattering of the center electrodes and the evaporation of the ferrite member 2, can be prevented, and the cost of the component 1 can be reduced, due to the low temperature firing.

Moreover, the ferromagnetic resonance half-width of the ferrite member 2 in the irreversible circuit component 1 can be set to be small. Thus, when the component 1 is used as a circulator or an isolator, the loss can be reduced.

As described above, the high frequency magnetic material ceramic composition of the present invention comprises materials having the general formula $(Ca, A)_zCu_xB_{8-x-z}O_{12}$ in which A represents Y and/or at least one rare earth element excluding Y, B represents metal elements which are different from A and include at least Fe and V, $0.002<x<0.2$, $3.0<z\leq3.09$, and the Ca/V ratio is a value of $2.0<Ca/V\leq2.4$.

In the prior art high frequency magnetic material, the firing temperature at the stoichiometric value Ca/V=2 is 1300° C. or higher. However, when the ranges of z, the Ca/V ratio, and x are set as described above, a high frequency magnetic material ceramic composition can be sintered at a temperature of 1100° C. or lower and has which a ferromagnetic resonance half-width of less than 500 Oe can be obtained.

When the composition is used in an irreversible circuit component such as an isolator component, the shape-accuracy of the circuit component is advantageously enhanced, and the cost is reduced, since evaporation of internal electrodes and scattering of the composition are suppressed. Moreover, the loss of the circuit component is reduced, since the ferromagnetic resonance half-width is small. Thus, the composition can be suitably used for the irreversible circuit component.

What is claimed is:

1. A high frequency magnetic material ceramic composition comprising a material having the general formula $(Ca, A)_z Cu_x B_{8-x-z} O_{12}$ in which A represents Y or at least one rare earth element excluding Y or a combination of Y and said rare earth element, B represents Fe, V and optionally at least one metal element different from A, $0.002<x<0.2$, $3.0<z\leq3.09$, and $2.0<Ca/V\leq2.4$.

2. A high frequency magnetic material ceramic composition according to claim 1, wherein $0.005\leq x\leq0.1$.

3. A high frequency magnetic material ceramic composition according to claim 2, wherein $0.02\leq x\leq0.1$.

4. A high frequency magnetic material ceramic composition according to claim 3, wherein B comprises at least one of Al, In and Zr.

5. A high frequency magnetic material ceramic composition according to claim 4, wherein $2.05<Ca/V\leq2.4$.

6. A high frequency magnetic material ceramic composition according to claim 5, wherein $2.05<Ca/v\leq2.2$.

7. A high frequency magnetic material ceramic composition according to claim 6, wherein A is Y, and B is Fe, V, Al, In and optionally Zr.

8. A high frequency magnetic material ceramic composition according to claim 1, wherein $2.05<Ca/V\leq2.4$.

9. A high frequency magnetic material ceramic composition according to claim 8, wherein $2.05<Ca/v\leq2.2$.

10. A high frequency magnetic material ceramic composition according to claim 1, wherein A is Y, and B is Fe, V, Al, In and optionally Zr.

11. An irreversible circuit component comprising:

a ferrite member comprising a high frequency magnetic material ceramic composition of claim 1;

plural center electrodes arranged in the ferrite member in such a manner as to be electrically insulated from each other and intersect in one plane thereof; and a DC magnetic field source arranged to apply the field to the center electrodes and the ferrite member.

12. An irreversible circuit component according to claim 11, wherein $0.005\leq x\leq0.1$.

13. An irreversible circuit component according to claim 12, wherein $0.02\leq x\leq0.1$.

14. An irreversible circuit component according to claim 13, wherein B comprises at least one of Al, In and Zr.

15. An irreversible circuit component according to claim 14, wherein $2.05<Ca/V\leq2.4$.

16. An irreversible circuit component according to claim 15, wherein $2.05<Ca/V\leq2.2$.

17. An irreversible circuit component according to claim 16, wherein A is Y, and B is Fe, V, Al, In and optionally Zr.

18. An irreversible circuit component according to claim 11, wherein $2.05<Ca/V\leq2.4$.

19. An irreversible circuit component according to claim 18, wherein $2.05<Ca/V\leq2.2$.

20. An irreversible circuit component according to claim 11, wherein A is Y, and B is Fe, V, Al, In and optionally Zr.

* * * * *